(12) United States Patent
Kuroda et al.

(10) Patent No.: US 8,588,200 B2
(45) Date of Patent: Nov. 19, 2013

(54) WIRELESS COMMUNICATION SYSTEM, WIRELESS COMMUNICATION METHOD, AND WIRELESS COMMUNICATION APPARATUS

(75) Inventors: Nahoko Kuroda, Tokyo (JP); Jinsook Lee, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 1527 days.

(21) Appl. No.: 11/579,552

(22) PCT Filed: Apr. 28, 2005

(86) PCT No.: PCT/JP2005/008137
§ 371 (c)(1),
(2), (4) Date: Nov. 3, 2006

(87) PCT Pub. No.: WO2005/109724
PCT Pub. Date: Nov. 17, 2005

(65) Prior Publication Data
US 2007/0286146 A1 Dec. 13, 2007

(30) Foreign Application Priority Data
May 6, 2004 (JP) .................................. 2004-137854

(51) Int. Cl.
*H04B 7/216* (2006.01)
(52) U.S. Cl.
USPC ............... 370/342; 455/231; 455/68; 455/69; 455/70; 455/502; 370/231; 370/278; 370/350; 370/510
(58) Field of Classification Search
USPC ......... 370/342, 335, 479, 231, 278, 350, 510; 455/231, 68, 69, 70, 502
See application file for complete search history.

(56) References Cited

U.S. PATENT DOCUMENTS

| 7,535,885 B2 * | 5/2009 | Horneman et al. ........... 370/342 |
| 2004/0009786 A1 * | 1/2004 | Terry ............................ 455/522 |
| 2006/0023628 A1 * | 2/2006 | Uehara et al. ................. 370/232 |

FOREIGN PATENT DOCUMENTS

| EP | 0828392 A2 | 3/1998 |
| EP | 1424799 A2 | 6/2004 |

(Continued)

OTHER PUBLICATIONS

3rd Generation Partnership Progject, 3GPP TR 25.896 V.2.0.0, Mar. 2004, Release 6.*

(Continued)

*Primary Examiner* — Khalid Shaheed
(74) *Attorney, Agent, or Firm* — Sughrue Mion, PLLC

(57) ABSTRACT

A wireless communication system of the present invention achieves improvement of reliability of communication of control data while suppressing the decrease in the communication throughput of data blocks and/or control data. The wireless communication system of the present invention is provided with a base station (1) and a mobile station (2). The mobile station (2) is configured to transmit a plurality of data blocks to the base station (1) at predetermined transmission time intervals. One of the base and mobile stations is configured to generate a plurality of control data used for control of transmission of said plurality of data blocks, to generate a plurality of control messages from said plurality of control data, and to transmit said plurality of control messages to the other of the base and mobile stations. Each of the control data is used for generation of M control messages out of the plurality of control messages, and each of the control messages is generated from M control data out of the plurality of control data.

26 Claims, 11 Drawing Sheets

(56) References Cited

FOREIGN PATENT DOCUMENTS

| | | | |
|---|---|---|---|
| JP | 6-77942 A | 3/1994 |
| JP | 6-197150 A | 7/1994 |
| JP | 7-38540 A | 2/1995 |
| JP | 7-123079 A | 5/1995 |
| JP | 8-154096 A | 6/1996 |
| JP | 8154096 A * | 6/1996 |
| JP | 10-98479 A | 4/1998 |
| JP | 2000-78118 A | 3/2000 |
| JP | 2001-513277 A | 8/2001 |
| JP | 2001-308711 A | 11/2001 |
| JP | 2002-208930 A | 7/2002 |
| JP | 2002-528960 A | 9/2002 |
| JP | 2003-179581 A | 6/2003 |
| JP | 2004-56798 A | 2/2004 |
| KR | 19990072648 | 9/1999 |
| WO | 93/20632 A1 | 10/1993 |
| WO | 03/009884 A2 | 2/2003 |
| WO | 03/098884 A1 | 11/2003 |

OTHER PUBLICATIONS

Translation of JP8-154096 A, Jun. 1996, Zaisho.*
3GPP, 3GPP, TR25.896 V2.0.0, Mar. 2004, pp. 21, 22, 25, to 28, 36, 37 (http://www.3gpp.org/ftp/Specs/archive/25_series/25.896/25896-600.zip).

* cited by examiner

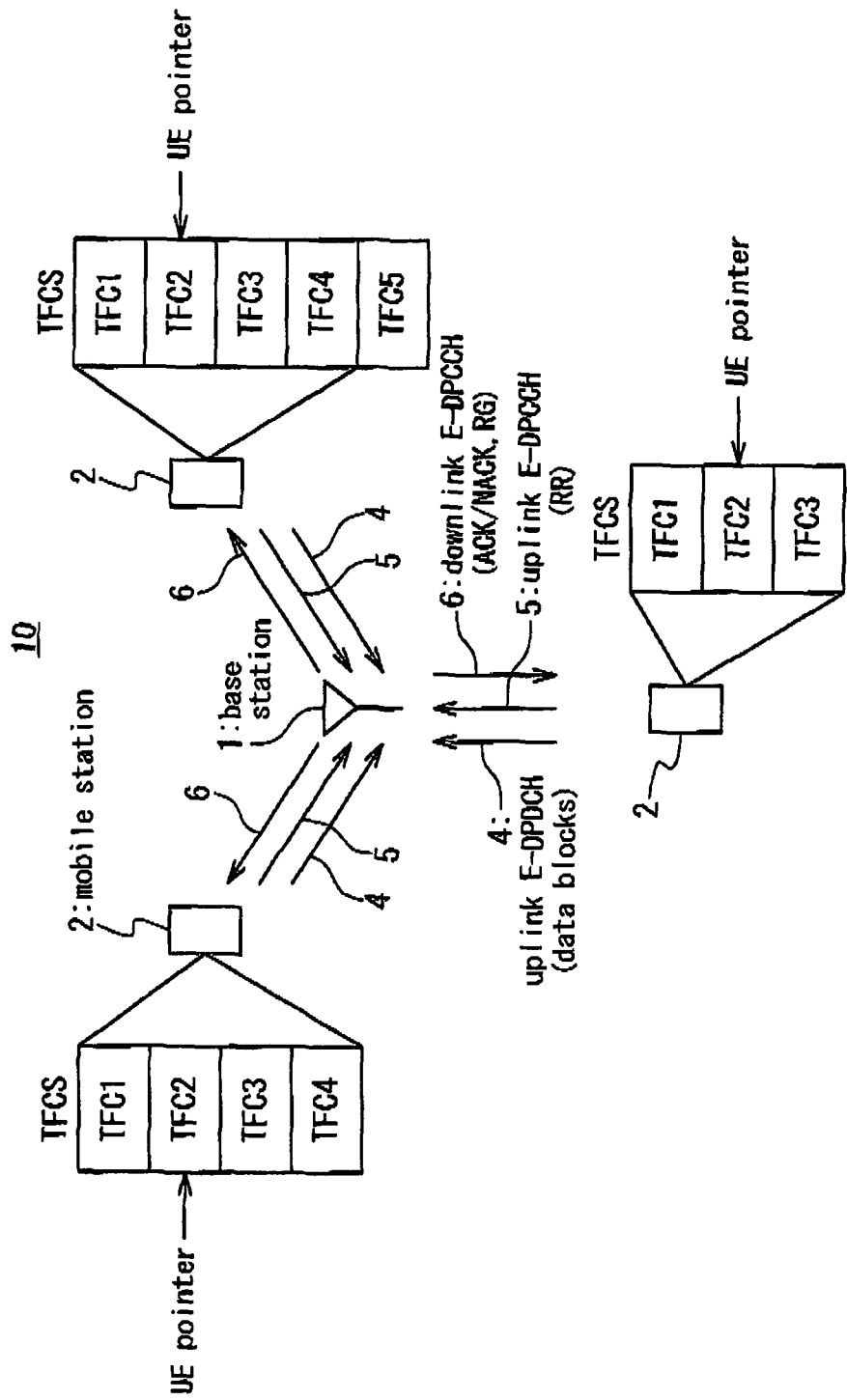

Fig. 8

| (N-1)-th update request ((N-1)-th update instruction) \ N-th update request (N-th update instruction) | Up | Down |
|---|---|---|
| Up | 000000 | 010101 |
| Down | 101010 | 111111 |

WIRELESS COMMUNICATION SYSTEM, WIRELESS COMMUNICATION METHOD, AND WIRELESS COMMUNICATION APPARATUS

This application claims priority from PCT Application No. PCT/JP2005/008137 filed Apr. 28, 2005, and from Japanese Patent Application No. 2004-137854 filed May 6, 2004, which applications are incorporated herein by reference.

TECHNICAL FIELD

The present invention is related to a communication technology, more particularly, to a communication technology suitable for the use in a WCDMA system.

BACKGROUND ART

A mobile communication system is often configured to communicate data blocks (packet) at predetermined communication intervals, and to also communicate control data for the communication control of the data blocks at the same communication intervals as the data blocks.

One example of such communication system is a mobile communication system adopting E-DCH (enhanced dedicated channel) (See 3GGP TR25.896 v2.0.0 "Feasibility Study for Enhanced Uplink for UTRA FDD" (2004-03)). The E-DCH (enhanced dedicated channel) is one of the most important specifications which have been considered to be applied to the WCDMA (Wideband Code Division Multiple Access) system. In the E-DCH, the HARQ (hybrid Automatic Repeat Request) have been considered to be adopted, and a mobile communication system that adopts the HARQ in the E-DCH is configured to communicate data blocks and ACK/NACK (acknowledgement/negative acknowledgement) messages between base stations and mobile stations at predetermined TTIs (transmission time intervals). The ACK/NACK message is a control data by which a receiving side which receives a data block informs the sending side which has transmitted the data block of whether the receiving side has successfully received the data block. For the case when a mobile station sends a data block to a base station, for example, the base station informs the mobile station of whether the base station successfully have received the data block by transmitting an ACK/NACK message through a downlink. When the sending side is informed by the ACK/NACK message that a certain data block is not successfully received, the sending side retransmits the data block.

Additionally, a mobile communication system that adopts the E-DCH is configured so that an RR (rate request) message and an RG (rate grant) message can be communicate between a base station and a mobile station. The RR message is a control data by which a mobile station requests a base station to update the maximum value of the transmission rate of the uplink. As is well known to those skilled in the art, a mobile station is provided with a TFCS (transport format combination set) composed of multiple TFCs (transport format combinations) in the mobile communication system that adopts the E-DCH. A base station determines allowed TFCs (allowed transport format combinations) out of the TFCS, and informs the mobile station of the set of the allowed TFCs. The mobile station selects one TFC from the allowed TFCs, and performs communication through the uplink using the selected TFC. The determination of the allowed TFCs is equivalent to determination of the maximum value of the transmission rate, because respective TFCs correspond to different transmission rates. The RR message is a control data by which the mobile station requests the base station to update the allowed uplink transport format combination subset. The mobile station generates an RR message from the status of the allowed transmitting power, and the desired transmission rate of the service. The transmission of the RR message is equivalent to the fact that the mobile station requests the base station to update the maximum value of the transmission rate of the uplink. The RG message, on the other hand, is a control data by which a base station updates the maximum value of the transmission rate of the uplink, more specifically, control data used for updating the allowed TFCs. It should be noted that the update of the allowed TFCs is equivalent to the update of the maximum value of the transmission rate of the uplink. The update of the allowed TFCs is achieved as follows: A mobile station is provided with an UE pointer that specifies allowed TFCs. The UE pointer indicates a TFC corresponding to the maximum transmission rate out of the allowed TFCs (hereinafter, referred to as the maximum TFC). The RG message includes an instruction increasing or decreasing the UE pointer, or a value indicative of the maximum TFC itself. The mobile station updates the UE pointer in response to the RG message, and thereby updates the allowed TFCs.

One issue of such mobile communication system is the suppression of the occurrence of the communication delay resulting from a communication error of control data. For example, occurrence of communication error of an ACK/NACK message may result in communication delay of data blocks. Let us assume a case when, although a base station actually transmits an ACK/NACK message indicating "NACK" to a mobile station after unsuccessful reception of a data packet, the mobile station erroneously recognizes that the ACK/NACK message indicates "ACK". In this case, the physical layer within the mobile station discards the data packet transmitted to the base station from the buffer, and starts to transmit the next data packet. Therefore, retransmission of the data packet that has not successfully received to the base station requires retransmission of the data packet from the upper layer to the physical layer. This causes large delay in the communication of data packets. When the retransmission from the upper layer to the physical layer can not be achieved, it results in loss of the data packet.

The same issue may apply to the RG messages and the RR messages. The base station of a WCDMA system is configured to reduce the noise rise thereof through transmitting an RG message to a mobile station to request the decrease in the maximum TFC, when the noise rise reaches near the quality threshold. Here, a noise rise of a certain base station is the ratio of the total received power to the noise power at the base station. However, the mobile station may transmit the next data block using a TFC corresponding to further higher transmission rate, when the mobile station erroneously receives the RG message and erroneously recognized that the mobile station is requested to increase the maximum TFC. This may further increase the noise rise of the base station, and result in deterioration of the reception quality of the uplink. Similarly, the base station may assign inappropriate allowed TFTs to the mobile station, when unsuccessfully receiving an RR message. For example, the base station may allow the mobile station to use a TFC corresponding to an unnecessarily high transmission rate, due to the erroneous reception of an RR message. This may prevent a mobile station which actually requires a TFC corresponding to a high transmission rate from using the TFC corresponding to the high transmission rate. Additionally, a base station may erroneously decide that a mobile station requests the decrease in the maximum TFC although the maximum TFC can be increased from the viewpoint of the noise rise, because of the unsuccessful reception of the RR message. This results in that an inappropriate decrease in the maximum TFC of the mobile station. As thus described, unsuccessful reception of RG and RR messages hinders the effective use of the resource, and causes the decrease in the throughput and the deterioration of the reception quality.

A technique is commonly known in which the same data is repeatedly transmitted to improve the communication reliability, and this technique is applicable to the communication of the control data in the above-described system. However, repeated transmission of the same control data over multiple TTIs results in an undesirable result as follows: Firstly, repeated transmission of an ACK/NACK message associated with one data block undesirably reduces the throughput of communication of data blocks. As shown in FIG. 1B, only one data block can transmitted for every two TTIs, when an ACK/NACK message associated with a data block is transmitted twice. Compared with the case that an ACK/NACK message associated with a data block is transmitted only once (See FIG. 1A), transmitting an ACK/NACK message associated with a data block twice results in undesired decrease in the throughput. Secondly, repeated transmission of the same control data over multiple TTIs undesirably reduces the transmission rate of the control data per one TTI, and undesirably increases the control cycle period. When the same control data is transmitted twice over two TTIs, the minimum update cycle period of the control data is 2 TTIs. This undesirably decreases the response of the communication control.

Various other approaches have been proposed for improving the reliability and throughput of the communication of the control data. Japanese Laid Open Patent Application No. JP-A 2001-308711 discloses a communication method of control information data in a communication system adopting 8B/10B coding. The disclosed communication method is directed to enable error detection of the communicated control information codes. On the sending side, a 22-bit-length control information data is divided into two 8-bit-length blocks and a single 6-bit-length block. The 8-bit length blocks are coded into 10-bit-length control information code through 8B/10B coding. Additionally, a 2-bit-length parity control corresponding to the 22-bit-length control information data is generated, and another 8-bit-length block is generated through attaching the 2-bit-length parity control to the 6-bit-length block. The 8-bit-length block generated is coded into a 10-bit-length control information code.

Japanese Laid-Open Patent Application No. JP-A Heisei 6-197150 discloses a technique for reducing communications traffic used for the control in which control information for the flow control is not exchanged if unnecessary. In this technique, transmission intervals at which the sending side transmits data are controlled in response to time intervals at which reception data are stored in a reception buffer on the receiving side, and time intervals at which the reception data are outputted from the reception buffer. The communications traffic for the control is reduced through appropriate control of the transmission intervals.

Japanese Laid-Open Patent Application No. JP-A 2003-179581 discloses a technique in which ACK/NACK messages are flexibly transmitted without signal transmission overhead through transmitting the ACK/NACK messages at time intervals different from time intervals at which data packets are transmitted.

Japanese Laid-Open Patent Application No. 2000-78118 discloses a technique for reducing erroneous operations resulting from erroneous reception of ARQ control data. In this technique, a plurality of blocks within a transmission frame is attached with one ARQ control data containing an error correction code, and a plurality of blocks of ACK/NACK messages within a response frame is attached with one ARQ control data. In the time domain, a super frame consisting of the transmission frame and the response frame is defined to optimize the communication timing.

Japanese Laid-Open Patent Application No. JP-A Heisei 7-38540 discloses a technique for reducing the ratio of ARQ control data to transmission data, and improving the throughput. In this technique, the sending side divides transmission data into a plurality of blocks attached with an error detection code, and transmits transmission data which are attached with one ARQ control data for N blocks. The reception side performs error detection on the respective blocks. When detecting an error, the receiving side issues a retransmission request. The sending side generates error correction codes for blocks relevant to the retransmission request, and generates a retransmission frame attached with one ARQ control data through incorporating the error correction codes. The reception side reproduces the correct data from the error correction codes within the re-transmission frame and the erroneous blocks which have been received.

Japanese Laid-Open Patent Application No. JP-A Heisei 7-123079 discloses a technique for maintaining the throughput by using a simple protocol. In this technique, the sending side successively transmits M blocks, and the receiving side successively performs error detection on these M blocks. When an error is detected in the i-th block, the reception side discards the i-th to M-th blocks, and returns a retransmission request response NAK for the i-th block. In response to the retransmission request response NAK, the sending side successively transmits i-th to (M+i−1)-th blocks. The receiving side successively performs error detection on these M blocks. Such process is repeated till all of the desired blocks are successfully received.

In accordance with the inventor's study, however, there is room for further improvement in these prior art.

DISCLOSURE OF INVENTION

An object of the present invention is to improve a communication method implemented in a communication system adapted to communicate data blocks (packet) at predetermined communication intervals, and to also communicate control data for the control of the communication of the data blocks at the same communication intervals as the data blocks.

Specifically, an object of the present invention is to provide a technique which suppresses the decrease in the throughput of the communication of the data blocks and/or the control data, while achieving improvement in the communication reliability of the control data.

In an aspect of the present invention, a wireless communication system is provided with a first communication apparatus, and a second communication apparatus. The first communication apparatus is configured to transmit a plurality of data blocks to the second communication apparatus at predetermined transmission time intervals. One of the first and second communication apparatuses is configured to generate a plurality of control data used for control of transmission of the plurality of data blocks, to generate a plurality of control messages from the plurality of control data, and to transmit the plurality of control messages to the other of the first and second communication apparatuses at the same time intervals as the transmission time intervals. Each of the control data is used for generation of M control messages out of the plurality of control message, while each of the control messages is generated from M control data out of the plurality of control data.

The wireless communication thus designed effectively improves communication reliability of the control data through the effect of time diversity, since one control data is transmitted over M transmission time intervals. On the other hand, since each of the plurality of control messages is generated from M control data out of said plurality of control data, one control data can be communicated per one transmission time interval. This avoids the decrease in the communication throughput of the control data, differently from the case that one control data is simply transmitted repeatedly. As thus described, the wireless communication system achieves improvement of the communication reliability of control data, while avoiding the decrease in the communication throughput of the control data.

In one preferred embodiment, said plurality of said control data respectively include error detection data indicative of whether said respective plurality of data blocks are successfully received by said second communication apparatus, and said plurality of control messages generated from said plurality of control data are transmitted from said second communication apparatus to said first communication apparatus. In this case, it is preferable that the first communication apparatus reproduces said error detection data from said plurality of control messages, and retransmits to said second communication apparatus data blocks which are not successfully received by said second communication apparatus, in response to said reproduced error detection data. Such structure allows transmitting one error detection data per one transmission time interval with high reliability. This is equivalent to the fact that such structure allows transmitting one data block per one transmission time interval. Therefore, the use of the above-described structure allows effectively improving the communication throughput of both of data blocks and error detection data, while improving the communication reliability of the error detection data.

In another preferred embodiment, said plurality of said control data respectively include transmission rate instruction data by which said second communication apparatus instructs to said first communication apparatus a maximum transmission rate allowed for transmission of said data blocks, and said plurality of control messages generated from said plurality of control data are transmitted from said second communication apparatus to said first communication apparatus. In this case, it is preferable that the first communication apparatus reproduces said transmission rate instruction data from said plurality of control messages, and controls transmission rate of said plurality of data blocks in response to said reproduced transmission rate instruction data. Such structure allows transmitting one transmission rate instruction data per one transmission time interval with high reliability. This preferably reduces the communication delay resulting from a communication error, while improving the followability of control of the maximum transmission rate allowed for the transmission of the data blocks.

In still another preferred embodiment, said control data respectively include transmission rate request data by which said first communication apparatus requests said second communication apparatus to update the maximum transmission rate allowed for transmission of said data blocks, and said control messages generated from said plurality of control data are transmitted from said first communication apparatus to said second communication apparatus. In this case, the second communication apparatus reproduces said transmission rate request data from said plurality of control messages, and controls the maximum transmission rate allowed for transmission of said data blocks in response to said reproduced transmission rate request data. Such structure allows transmitting one transmission rate request data per one transmission time interval with high reliability. This preferably reduces the communication delay resulting from a communication error, while improving the followability of control of the maximum transmission rate allowed for the transmission of the data blocks.

In still another preferred embodiment, said plurality of control data respectively include data amount data indicative of the data amount of a transmission buffer in which said first communication apparatus stores said data blocks before transmission of said data blocks, and said plurality of control messages generated from said plurality of control data are transmitted from said first communication apparatus to said second communication apparatus. In this case, it is preferable that the second communication apparatus reproduces said data amount data from said plurality of control messages, and controls the maximum transmission rate allowed for transmission of said data blocks in response to said reproduced data amount data. Such structure allows transmitting one data amount data per one transmission time interval with high reliability. This preferably reduces the communication delay resulting from a communication error, while improving the followability of control of the maximum transmission rate allowed for the transmission of the data blocks.

Specifically, the control data is preferably reproduced from the control messages as described in the following. In a preferred embodiment, each of said plurality of control messages includes M fields, and said one control data is contained in a first field of a first control message out of said M control messages associated with said one control data, a second field of a second control message out of said M control messages, ..., and an M-th field of an M-th control message out of said M control messages. In this case, said other communication apparatus reproduces said one control data through soft decision on said first field of said first control message, said second field of said second control message, ..., and said M-th field of said M-th control message.

In another preferred embodiment, each of said M control messages associated with said one control data includes one selected bit sequence which is selected from a plurality of predetermined bit sequences in response to said M control data used for generation of said M respective control messages, and said other communication apparatus is configured to determine the most likely bit sequences of said respective plurality of control messages through performing soft decision on said respective plurality of control messages, to determine M candidates of said one control data from said respective most likely bit sequences of said plurality of control messages, and to finally determine said one of control data from said M candidates based on reliabilities of said M control messages associated with said one control data, said reliabilities being calculated in said soft decision.

Such wireless communication system is preferably applied to a WCSMA system adapted to the E-DCH. Specifically, a WCDMA system according to the present invention is provided with a base station and a mobile station configured to transmit a plurality of data blocks to the base station at predetermined transmission time intervals. One of the mobile and base stations is configured to generate a plurality of control data used for control of transmission of said data blocks to said base station, to generate a plurality of control messages from said plurality of control data, and to transmit said plurality of control messages to the other of said mobile and base stations at the same time intervals as said transmission time intervals. Each of said control data is used for generation of M control messages out of said plurality of control messages, while each of said control messages is generated from M control data out of said plurality of control data.

For achieving HARQ in the WCDMA system, It is preferable that said plurality of control messages generated from said plurality of control data are transmitted from said base station to said mobile station, and said plurality of control data respectively includes error detection data indicative of whether or not said respective plurality of data blocks are successfully received by said base station. In this case, it is preferable that said mobile station reproduces said error detection data from said plurality of control messages, and retransmits data blocks out of said plurality data blocks, which are not successfully received by said base station, in response to said reproduced error detection data.

Additionally, in order to achieve appropriate control of allowed TFCs, said plurality of control data respectively include TFC update instructions instructing update of allowed TFCs "allowed transport format combinations" of said mobile station, and said plurality of control messages generated from said plurality of control data are transmitted from said base station to said mobile station. In this case, said mobile station reproduces said allowed TFC instructions from said plurality of control messages, and controls said allowed TFCs in response to said reproduced TFC update instructions.

In order to achieve appropriate control of allowed TFCs, it is also preferable that said plurality of control data respectively includes TFC update requests by which said mobile station requests said base station to update allowed TFCs of said mobile station, and said plurality of control messages generated from said plurality of control data are transmitted from said mobile station to said base station. In this case, the base station reproduces said TFC update requests from said plurality of control messages, and controls said allowed TFCs of said mobile station in response to said reproduced TFC update requests.

Additionally, it is preferable that said plurality of control data respectively includes data amount data indicative of the data amount of a transmission buffer in which said mobile station stores said data blocks before transmission of said data blocks, and said plurality of control messages generated from said plurality of control data are transmitted from said mobile station to said base station. The base station reproduces said data amount data from said plurality of control messages, and controls said allowed TFCs of said mobile station in response to said reproduced data amount data.

The present invention, which is directed to a communication system which can communicate data blocks (packets) at predetermined communication intervals and can also communicate control data for communication control of the data blocks at the same communication intervals as the data blocks, achieves improvement of communication reliability of control data, while suppressing the decrease in the communication throughput of the data blocks and/or control data.

BRIEF DESCRIPTION OF DRAWINGS

FIG. 2 is a block diagram illustrating the structure of a mobile communication system in one embodiment of the present invention;

FIG. 8 is a table illustrating a coding method used for generating the N-th RR message (N-th RG message) in this embodiment;

BEST MODE FOR CARRYING OUT THE INVENTION

Schematic Description of Communication System

Figure 1A:
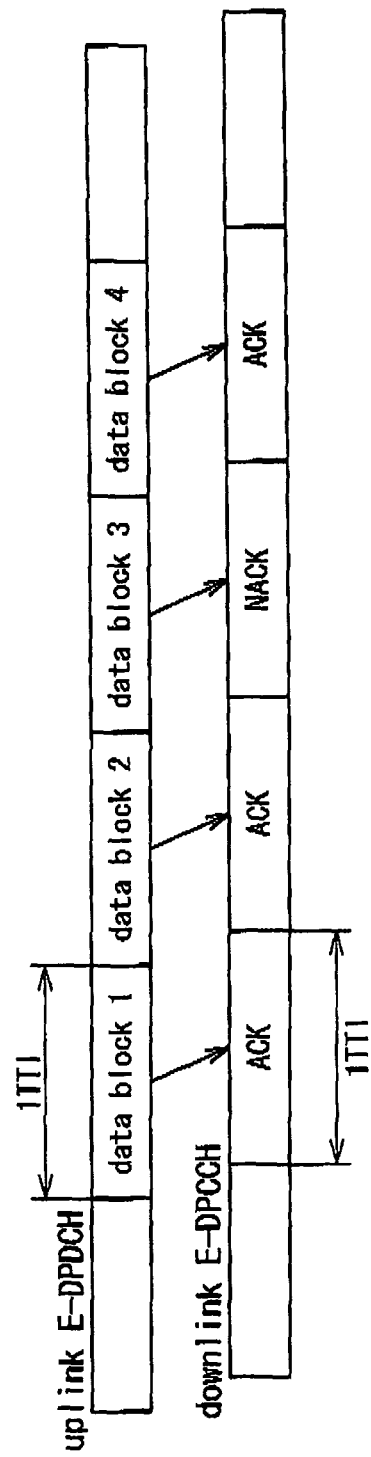
FIG. 1A is a diagram illustrating a conventional communication method in which one data block and one ACK/NACK message are transmitted in a single TTI.
Figure 1B:
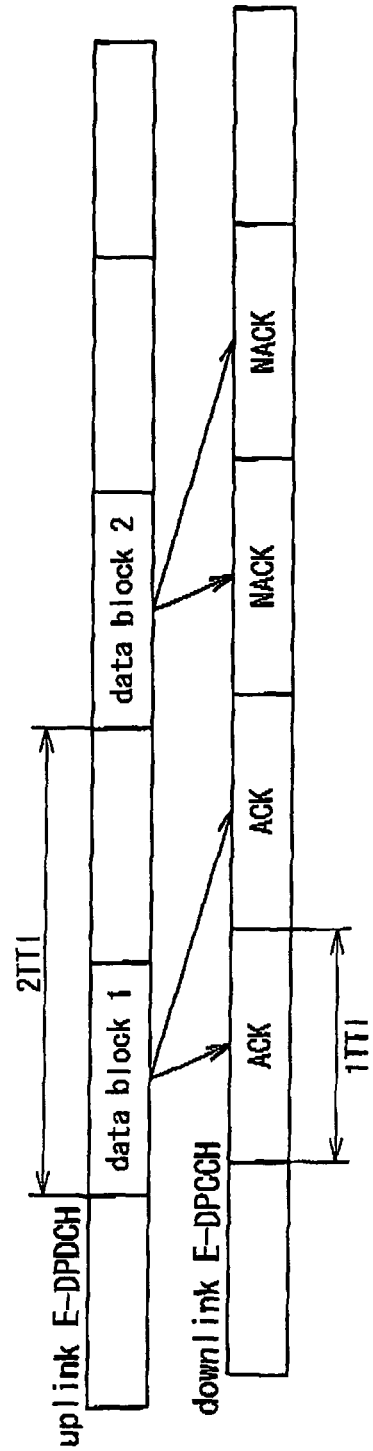
FIG. 1B is a diagram illustrating a communication method in which the same ACK/NACK message is transmitted over two TTIs.

In one embodiment of the present invention, as shown in FIG. 2, a mobile communication system 10 is configured to be adapted to the E-DCH using HARQ. Specifically, the mobile communication system 10 is provided with a base station 1 and mobile stations 2. Each mobile station 2 contains a TFCS composed of a plurality of TFCs, and a UE pointer indicating allowed TFCs which the each mobile station 2 is allowed to use out of the TFCS.

The base station 1 and the mobile stations 2 are connected through an uplink E-DPDCH 4 (uplink enhanced dedicated physical data channel), an uplink E-DPCCH 5 (uplink enhanced dedicated physical control channel), and a downlink E-DPCCH 6. The uplink E-DPDCH 4 is a channel used for data blocks from the mobile stations 2 to the base station 1. The uplink E-DPCCH 5 is a channel used for transmitting control messages from the mobile stations 2 to the base station 1, which control messages are used for the control of the transmission of the data blocks. The control messages transmitted through the uplink E-DPCCH include RR messages, which request the base station 1 to update the allowed TFCs, that is, to update the UE pointer. The downlink E-DPCCH 6 is used for transmitting control messages from the base station 1 to the mobile stations 2, which control messages are used for the control of the transmission of data blocks from the mobile stations 2 to the base station 1. The control messages transmitted through the downlink E-DPCCH include ACK/NACK messages and RG messages. The ACK/NACK messages are control messages used to inform the mobile stations 2 of whether the base station 1 successfully receives data packets. The RG messages are control messages used to indicate the mobile stations 2 to update the allowed TFCs, that is, to update the UE pointers.

The RR messages and the RG messages, which are transmitted through the uplink E-DPCCH 5 and downlink E-DPCCH 6, respectively, are used for the control of the allowed TFCs of the respective mobile stations 2. A mobile station 2 requests the base station 1 to increase the maximum TFC by using an RR message, when it is necessary to transmit data blocks at a transmission rate higher than the maximum transmission rate allowed by the allowed TFCs. Adversely, a mobile station 2 requests the base station 1 to decrease the maximum TFC by using an RR message, when the mobile station 2 can transmit data blocks at a desired transmission rate even if the maximum TFC is decreased. The base station 1 transmits RG messages to the respective mobile stations 2 to instruct the update of the allowed TFCs, in response to the noise rise of the base station 1 and the RR messages received from the mobile stations 2. Through this operation, the base station 1 controls the allowed TFCs of the mobile stations 2 so that the noise rise does not exceed a predetermined threshold.

The ACK/NACK messages transmitted through the downlink E-DPCCH 6 are used for retransmission control of data blocks. Every when receiving a data block, the base station 1 decides whether the base station 1 successfully receives the data block, from a CRC (cyclic redundancy check) attached to the data block. The base station 1 informs the mobile station 2 of the decision result with an ACK/NACK message. The base station 1 generates the N-th ACK/NACK message in response to the reception of the N-th data block. The N-th data block and the N-th ACK/NACK message may be referred to as the data block #N, and the ACK/NACK message #N, respectively, hereinafter. Data blocks and ACK/NACK messages are transmitted at one TTI at the minimum limit.

The mobile communication system 10 in this embodiment adopts a special method for generation and communication of ACK/NACK messages, RG messages, and RR messages between the base station 1 and the mobile stations 2. The mobile communication system 10 thereby achieves suppression of the reduction of the communication throughput of the data blocks and the control data, and also achieves improvement of the communication reliability of the control data. Communication procedures of the ACK/NACK messages, the RG messages, and the RR messages are described below in detail.

(Transmission and Reception of ACK/NACK Messages)

Figure 3:
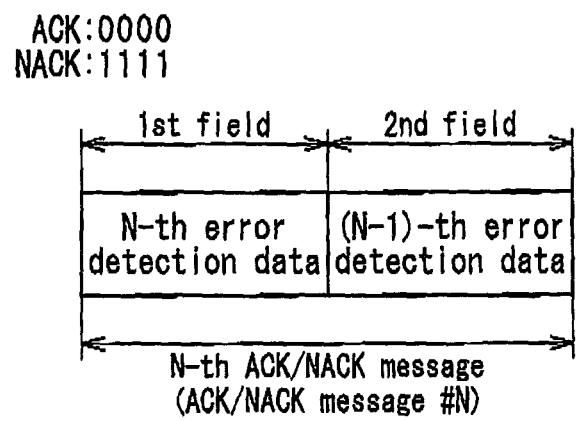
FIG. 3 is a diagram illustrating the configuration of an ACK/NACK message in this embodiment.

FIG. 3 illustrates contents of ACK/NACK messages used in this embodiment. In this embodiment, each ACK/NACK message is an 8-bit data, composed of a first field of 4 bits, and a second field of 4 bits. The first field of the N-th ACK/NACK message is used to contain error detection data indicative of whether the base station 1 successfully receives the N-th data block (N-th error detection data). The second field of the N-th ACK/NACK message is used to contain error detection data indicative of whether the base station 1 successfully receives the (N−1)-th data block ((N−1)-th error detection data). Each error detection data is set to a value of "0000" to indicate "ACK", that is, to indicate that the base station 1 successfully receives the associated data packet. To indicate "NACK", that is, to indicate that the base station 1 unsuccessfully receives the associated data packet, on the other hand, each error detection data is set to a value of "1111". It should be noted that the contents of the respective ACK/NACK messages in this embodiment are different from those of the ACK/NACK messages described in the Background Art.

Figure 4:
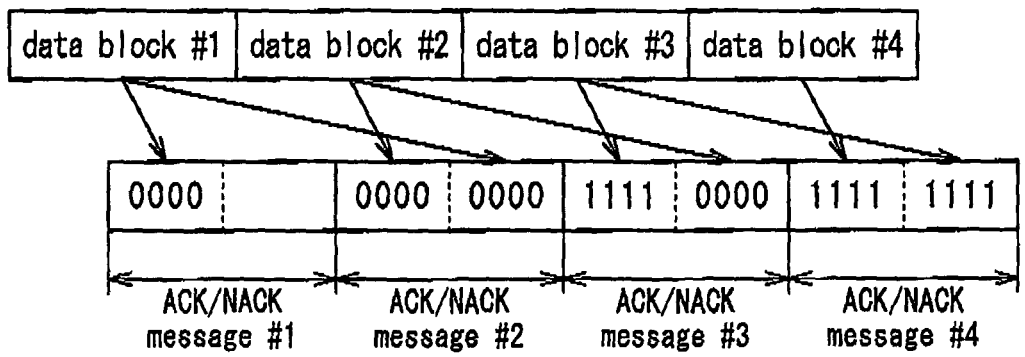
FIG. 4 is a diagram illustrating a communication method of ACK/NACK messages in this embodiment.

FIG. 4 illustrates contents of the ACK/NACK messages #1 to #4 which the base station 1 generates upon receiving the data block #1 to #4. The ACK/NACK messages #1 to #4 are generated in response to the reception of the data block #1 to #4. The ACK/NACK message #1 contains error detection data of "0000" in the first field thereof, which data is associated with the data block #1. The ACK/NACK message #2 contains error detection data associated with the data block #2 in the first field, and contains error detection data associated with the data block #1 in the first field. The same goes for the ACK/NACK message #3, and #4.

The mobile station 2 reproduces the original error detection data upon receiving the ACK/NACK messages. Two ACK/NACK messages are used to reproduce one error detection data. Specifically, the mobile station 2 performs soft decision on the first field of the ACK/NACK message #1 and the second field of the ACK/NACK message #2 to determine the most likely value of the error detection data associated with the data block #1. Correspondingly, the mobile station 2 performs soft decision on the first field of the ACK/NACK message #2 and the second field of the ACK/NACK message #3 to determine the most likely value of the error detection data associated with the data block #2. The same goes for the error detection data associated with the data blocks #3 and #4.

The communication of the ACK/NACK messages through the above-described communication procedure allows the mobile communication system in this embodiment to achieve improvement of the transmission reliability of the error detection data without decreasing the communication throughput of the data blocks and the error detection data. The mobile communication system in this embodiment generates two ACK/NACK messages from one error detection data, and transmits the generated two ACK/NACK messages over two TTI. This enhances the effect of the time diversity, and effectively improves the transmission reliability of the error detection data. On the other hand, since each ACK/NACK messages are composed of two error detection data, one error detection data can be actually transmitted per one TTI. The fact that one error detection data can be transmitted per one TTI is equivalent to the fact that one data block can be transmitted per one TTI. Therefore, the communication system in this embodiment can avoid the decrease in the communication throughput of the data blocks and the error detection data.

Figure 5:
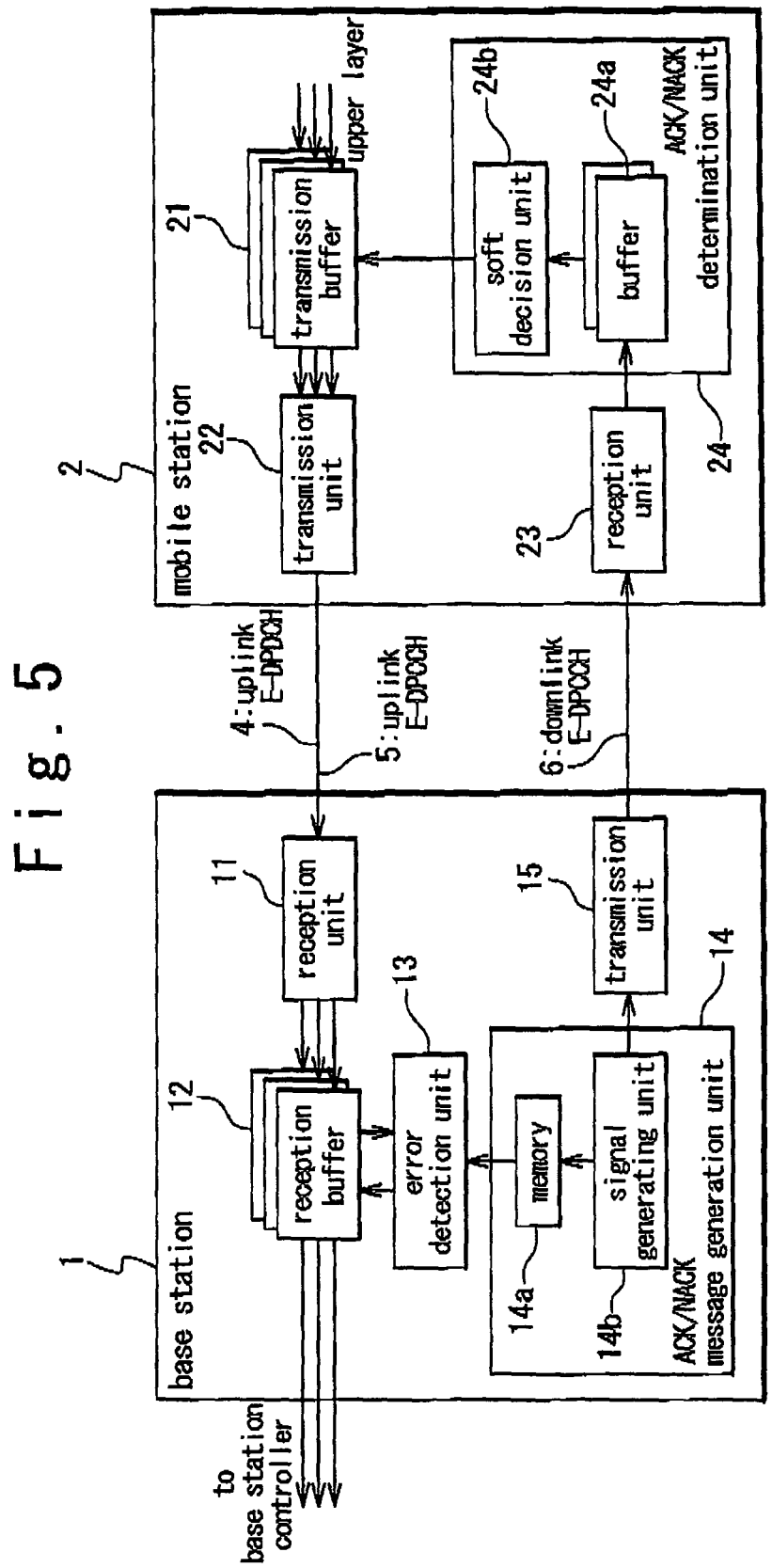
FIG. 5 is a block diagram illustrating the structures of portions of a base station and a mobile station, the portions being relevant to communication of ACK/NACK messages.

FIG. 5 illustrates a specific example of the structure of a base station 1 and a mobile station 2 for implementing the communication procedure described above. It should be noted that the structures of only portions of the base station 1 and the mobile station 2 in FIG. 5, the portions being relevant to the exchange of the ACK/NACK messages are illustrated.

The base station 1 is composed of a reception unit 11, a reception buffer 12, and an error detection unit 13. The reception unit 11 receives data blocks from the mobile station 2 through the uplink E-DPDCH 4, and stores the received data blocks in the reception buffer 12. The error detection unit 13 determines whether or not the respective data blocks are successfully received by using the CRCs contained in the data blocks, and generates error detection data indicative of whether or not the respective data blocks are successfully received. The contents of the error detection data are as described above; the N-th error detection data is indicative of whether the N-th data block is successfully received. Successfully received data blocks are transmitted to the upper layer, and deleted from the reception buffer 12. On the other hand, a data block with respect to which an error is found is left in the reception buffer 12.

The base station 12 additionally includes an ACK/NACK message generation unit 14 and a transmission unit 15. The ACK/NACK message generation unit 14, which has a function of generating ACK/NACK messages from the error detection data received from the error detection unit 13, includes a memory 14a and a message generating unit 14b. The memory 14a stores the error detection data received from the error detection unit 13. The message generating unit 14b generates ACK/NACK messages from the error detection data stored in the memory 14a. As described above, the N-th ACK/NACK message is composed of the error detection data associated with the (N−1)-th data block, and the error detection data associated with the N-th data block, while the (N+1)-th ACK/NACK message is composed of the error detection data associated with the N-th data block, and the error detection data associated with the (N+1)-th data block. The transmission unit 15 transmits the generated ACK/NACK messages to the mobile station 2 through the downlink E-DPCCH 6. The transmission unit 15 is configured to send an ACK/NACK message for each TTI.

The mobile station 2 includes a transmission buffer 21, a transmission unit 22, a reception unit 23, and an ACK/NACK determination unit 24. The transmission buffer 21 temporarily stores data blocks generated by an upper layer. The transmission unit 22 transmits the data blocks stored in the transmission buffer 21 to the base station 1 through the uplink E-DPDCH 4. The transmission unit 22 is configured to transmit a data block for each TTI. The reception unit 23 receives ACK/NACK messages from the base station 1 through the downlink E-DPCCH 6. The ACK/NACK determination unit 24 has a function of determining from the received ACK/NACK messages whether or not each data block is successfully received by the base station 1; the ACK/NACK determination unit 24 includes a buffer 24a and a soft decision unit 24b. The buffer 24a stores the ACK/NACK messages successively received by the reception unit 23. The soft decision unit 24b performs soft decision on the ACK/NACK messages stored in the buffer 24a, and determines from the results of the soft decision whether or not each data block is successfully received by the base station 1. The decision on the N-th data block is achieved by using the error detection data contained in the first field of the N-th ACK/NACK message and the error detection data contained in the second field of the (N+1)-th ACK/NACK message. The soft decision unit 24b generates discard instructions that instruct discard of successfully received data blocks, and retransmission instructions that instruct retransmission of unsuccessfully received data blocks.

Figure 6:
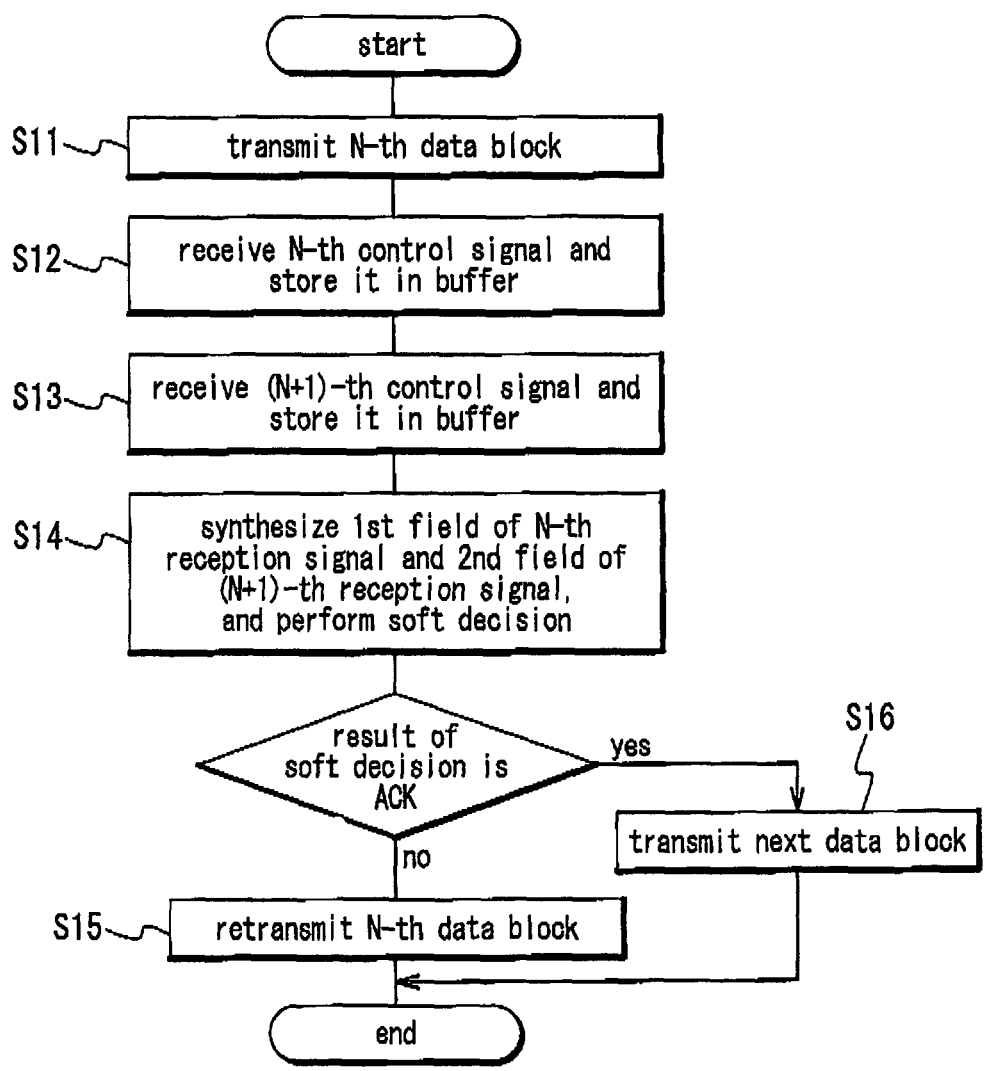
FIG. 6 is a flowchart illustrating the procedure of the reproduction control in the mobile station.

FIG. 6 is a flowchart illustrating a procedure of transmission and retransmission of the N-th data block.

The N-th data block is transmitted to the base station 1 by the transmission unit 22 through the uplink E-DPDCH 4, after being stored in the transmission buffer 21 in the mobile station 2 (Step S11). It should be noted that the N-th data block is not deleted from the transmission buffer 21 after being transmitted to the base station 1. In response to the reception of the N-th data block, the N-th ACK/NACK message is then transmitted from the base station 1 to the mobile station 2 through the downlink E-DPCCH 6. The N-th ACK/NACK message is received by the reception unit 23 and stored in the buffer 24a (Step S12).

In the same way, the (N+1)-th data block is transmitted to the base station 1, and in response to the reception of the (N+1)-th data block, the (N+1)-th ACK/NACK message is transmitted from the base station 1 to the mobile station 2. The (N+1)-th ACK/NACK message is received by the reception unit 23, and stored in the buffer 24a (Step S13).

Soft decision is then performed by the soft decision unit 24b on whether or not the N-th data block is successfully received (Step S14). The soft decision related to the N-th data block is performed on the error detection data contained in the first field of the N-th ACK/NACK message, and the error detection data contained in the second field of the (N+1)-th ACK/NACK message. The soft decision unit 24b estimates the most likely error detection data from these error detection data, and determines whether or not the N-th data block is successfully received, on the basis of the estimated error detection data. When determining that the N-th data block is unsuccessfully received, the soft decision unit 24b generates a retransmission instruction that instructs the retransmission of the N-th data block. In response to the retransmission instruction, the transmission buffer 21 and the transmission unit 22 transmits the N-th data block to the base station 1 again (Step S15). When determining that the N-th data block is successfully received, the soft decision unit 24b generates a discard instruction that instructs discard of the N-th data block. The transmission buffer 21 and the transmission unit 22 discard the N-th data block in response to the discard instruction, and transmit the next data block to the base station 1 (Step S16).

It would be easily understood that such operation of the mobile station 2 actually achieves the above-described communication procedure.

(Exchange of RR Message and RG Message)

Figure 7:
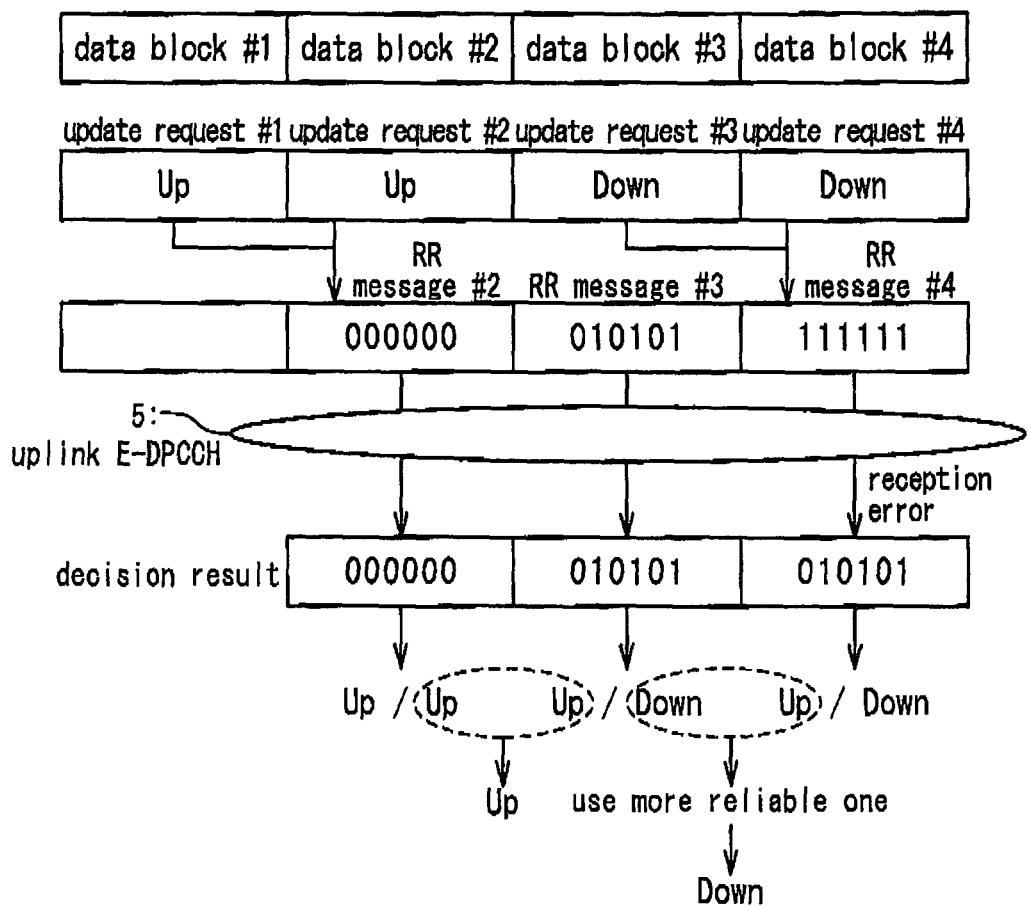
FIG. 7 is a diagram illustrating a communication method of RR messages in this embodiment.

In this embodiment, as shown in FIG. 7, the generation of the N-th RR message (RR message #7) within the mobile station 2 is achieved through coding an update request generated synchronously with the transmission of the (N−1)-th data packet (the update request #N−1), and an update request generated synchronously with the transmission of the N-th data packet (the update request #N). An update request is a control data that requests the base station 1 to update the allowed TFCs. There are two kinds of the update request, "Up" and "Down". The "Up" update request is used to request the increase of the maximum TFC, and the "Down" update request is used to request the decrease of the maximum TFC. It should be noted that the content of the update request is identical to the content of the RR message described in the Background Art. In the following, the update request generated synchronously with the transmission of the i-th data packet is simply referred to as the i-th update request.

FIG. 8 is a table illustrating the bit sequence of the N-th RR message, which is generated from the (N−1)-th update request and the N-th update request. When the (N−1)-th and N-th update requests are both "Up" update requests, for example, the value of the RR message is set to "000000". The same applies to other cases.

Referring back to FIG. 7, the RR messages successively generated by the mobile station 2 are transmitted to the base station 1 through the uplink E-DPCCH 5. The minimum transmission interval of the RR message is one TTI. Upon receiving an RR message, the base station 1 determines the most likely bit sequence out of the bit sequences shown in FIG. 8, and recognizes the original update request from the most likely bit sequence. Furthermore, the base station 1 finally determines the content of the N-th update request from the update requests recognized from the N-th and (N+1)-th RR messages. In FIG. 7, for example, the content of the update request #2 is determined on the basis of the RR messages #2 and #3. Since the contents of the RR requests #2 obtained from the RR messages #2 and #3 are identically "Up", the base station 1 determines that the content of the update request #2 is "Up". However, the contents of the update requests obtained from two RR messages may be different due to a reception error. In this case, the base station 1 decides the content of the update request obtained from the RR message with higher reception quality as the correct content of the update request. That is, the base station 1 discards the content of the update request obtained from the RR message which experiences a reception error. The occurrence of the reception error can be easily detected from the fact that the received RR message is not identical to any of the predetermined bit sequences (that is, the bit sequences shown in FIG. 8). In FIG. 7, for example, the contents of the update request

3 obtained from the RR messages #3 and #4 are different from each other, due to the reception error of the RR message #4. In this case, the base station 1 disregards the update request #3 obtained from the RR message #4, which experiences the reception error, and determines the content of the update request #3 obtained from the RR message #3 as the correct content of the update request #3.

The above-described communication procedure of the RR messages allows the mobile communication system in this embodiment to achieve improvement of the transmission reliability of the update requests without decreasing the communication throughput of the update requests. The mobile communication system in this embodiment generates two RR messages from one update request, and transmits the two RR messages over two TTI. This enhances the effect of time diversity, and effectively improves the transmission reliability of the update request. On the other hand, since each RR message is generated from two update requests, one update request can be actually transmitted for each TTI in this embodiment. Therefore, the communication system in this embodiment avoids the decrease in the communication throughput of the update requests.

Figure 9:
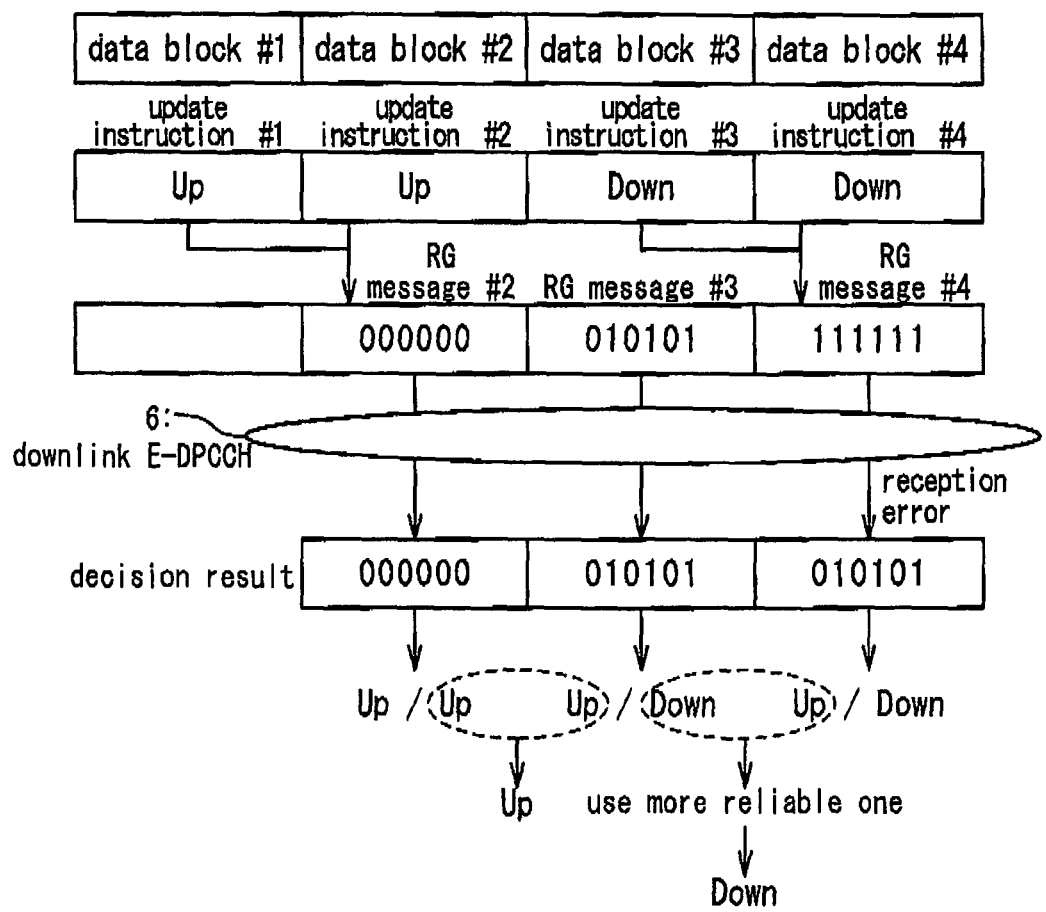
FIG. 9 is a diagram illustrating a communication method of RG messages in this embodiment.

As shown in FIG. 9, such communication procedure is also applied to the communication of the RG messages. The generation of the N-th RG message (RG message #N) within the base station 1 is achieved by coding the update instruction generated synchronously with the reception of the (N−1)-th data packet (update instruction #N−1), and the update instruction generated synchronously with the reception of the N-th data packet. An update instruction is a control data that instructs the mobile station 2 to update the allowed TFCs. It should be noted that the update instruction in this embodiment has a content equivalent to the RR message described in the Background Art. The format of the RG message is identical to that of the RR message shown in FIG. 8.

The RG messages successively generated by the base station 1 are transmitted to the mobile station 2 through the downlink E-DPCCH 6. The minimum transmission interval of the RG messages is one TTI. The procedure in which the mobile station 2 reproduces the update instructions from the RG messages is identical to the procedure in which the base station 1 reproduces the update requests from the RR messages. When receiving the RG messages, the mobile station 2 performs soft decision on the received RG messages, and determines the most likely bit sequences of the received RG messages. The mobile station 2 recognizes the contents of the update instructions indicated by the RG messages. That is, the mobile station 2 recognizes the contents of the N-th and (N−1)-th update instruction from the N-th RG message. Additionally, the mobile station 2 finally determines the content of the N-th update instruction from the N-th and (N+1)-th RG messages. When the contents of the update instructions obtained from the two RG messages are different, the mobile station 2 determines the content of the update request obtained from the RG message with higher reception quality as the correct content of the update request. That is, the mobile station 2 discards the content of the update instruction obtained from the RG message which experiences reception error.

The communication of the RG messages through such communication procedure allows the mobile communication system in this embodiment to achieve improvement of the transmission reliability of the update instructions.

The above-described communication method of the RR messages and the RG messages effectively improves the communication reliability of the update requests and the update instructions. This is preferable for achievement of the control of the allowed TFCs, that is, the appropriate control of the noise rise, and the effective use of the resources. In the meantime, the communication throughput of the update requests and the update instructions is not decreased; that is, the above-described communication method allows transmitting one update request and one update instruction for one TTI. Therefore, the above-described communication method allows the control cycle of the allowed TFCs to be one TTI, and effectively improves the followability of the noise rise control.

Figure 10:
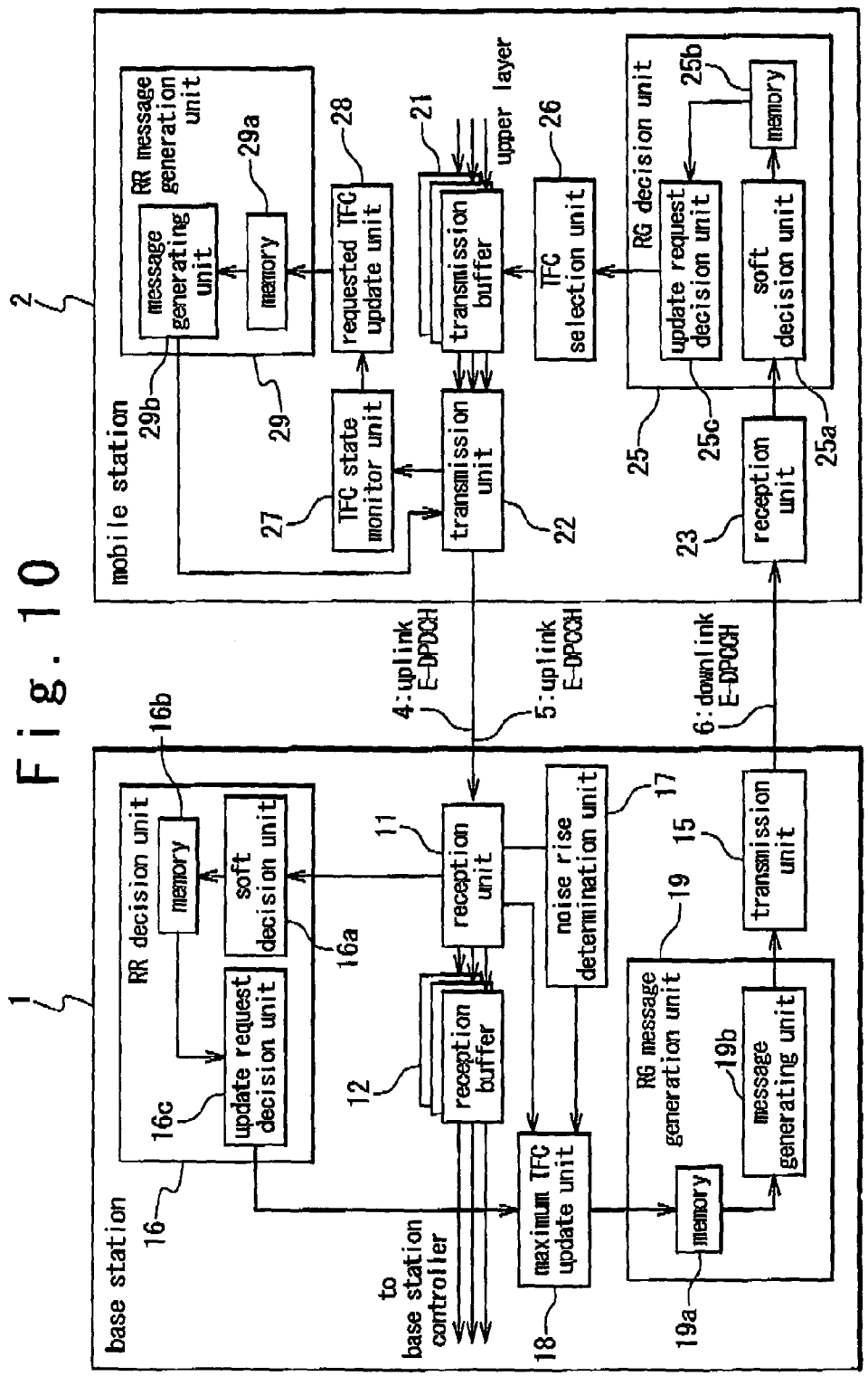
FIG. 10 is a block diagram illustrating the structures of portions of the base station and the mobile station, the portions being relevant to communication of RR and RG messages.

FIG. 10 illustrates specific structures of the base station 1 and the mobile station 2 for implementing the above-described communication method. It should be noted that only portions of the base station 1 and the mobile station 2 are illustrated in FIG. 10, the portions being relevant to the exchange of the RR messages and the RG messages.

In order to reproduce update instructions from RR messages transmitted from the mobile station 2 through the E-DPDCH 4, the base station 1 is provided with an RR decision unit 16. The RR decision unit 16 includes a soft decision unit 16a, a memory 16b, and an update request decision unit 16c. The soft decision unit 16a performs soft decision on the respective RR messages, and determines the most likely bit sequences of the RR messages. Furthermore, the soft decision unit 16a determines the contents of the (N−1)-th and N-th update requests from the bit sequence determined with respect to the N-th RR message. Additionally, the soft decision unit 16a calculates the reliability of the soft decision with respect to each RR message. The memory 16b stores the contents of the update request determined by the soft decision unit 16a, and the reliabilities of the respective RR messages. The update request decision unit 16c finally determines the respective update request from the contents of the update requests, and the reliabilities of the RR messages, which are stored in the memory 16b. As described above, the N-th update request is determined from the update requests obtained from the N-th and (N+1)-th RR messages. When the update requests obtained from the H-th and (N+1)-th RR messages are different from each other, the N-th update request is determined as the update request obtained from the RR message with higher reliability.

In order to transmit the RG messages in response to the update requests reproduced by the RR decision unit 16, the base station 1 additionally includes a noise rise determination unit 17, a maximum TFC update unit 18, and an RG message generation unit 19. The noise rise determination unit 17 measures the noise rise of the base station 1. The maximum TFC update unit 18 determines the maximum TFC of each mobile station 2 from the noise rise of the base station 1, and generates the update instructions so as to achieve the determined maximum TFC. The update instructions are determined so that the requested TFC is allowed if possible, under the condition in which the noise rise does not exceed the predetermined threshold. The RG message generation unit 19 generates the RG messages from the update instructions generated by the maximum TFC update unit 18. Specifically, the RG message generation unit 19 is provided with a memory 19a and a message generating unit 19b. The memory 19a receives and stores the update instructions generated by the maximum TFC update unit 18. The message generating unit 19b generates the RG messages from the update instructions stored in the memory 19a. As described above, the N-th RG message is generated from the (N−1)-th and N-th update instructions, and the (N+1)-th KG message is generated from the N-th and (N+1)-th update instructions. The association of the N-th RG message with the (N−1)-th and N-th update instructions is as shown in FIG. 8. The generated RG messages are transmitted to the mobile station 2 by the transmission unit 15 through the downlink E-DPCCH 6.

The mobile station 2, on the other hand, includes an RG decision unit 25 to reproduce the update instructions from the RG messages. The RG decision unit 25 reproduces the update instructions from the RG messages through the same operation as the operation of the RR decision unit 16 reproducing the update requests from the RR messages. Specifically, the RG decision unit 25 is provided with a soft decision unit 25a, a memory 25b, and an update instruction decision unit 25c. The soft decision unit 25a performs soft decision on each RG message and determines the most likely bit sequence of the RG message. It should be noted that the bit sequence determined with respect to the N-th RG message indicates the contents of the (N−1)-th and N-th update instructions. Additionally, the soft decision unit 25a calculates the reliability of the soft decision with respect to each RG message. The memory 25b stores the bit sequences and reliabilities of the RG messages determined by the soft decision unit 25a. The update instruction decision unit 25c reproduces the respective update instructions from the bit sequences and reliabilities of the RG messages stored in the memory 25b. As described above, the N-th update instruction is determined from the N-th and (N+1)-th RG messages. When the update instructions obtained from the N-th and (N+1)-th RG messages are different from each other, the N-th update instruction is determined as the update instruction obtained from the RG message with higher reliability.

In order to control the TFC used for the transmission of the data blocks in response to the update instructions, the mobile station 2 is provided with a TFC selection unit 26 and a TFC state monitor unit 27. The TFC selection unit 26 contains the TFCS and the UE pointer (See FIG. 2), and selects a TFC used for the transmission of the data blocks out of the allowed TFCs indicated by the UE pointer. The UE pointer contained by the TFC selection unit 26 is adjusted in accordance with the update instructions obtained by the RG decision unit 25. In other words, the control of the maximum TFC is responsive to the update instructions. When the increase of the maximum TFC is instructed by an update instruction, the TFC selection unit 25 increases the UE pointer by one to increase the maximum TFC. Adversely, when the decrease of the maximum TFC is instructed by an update instruction, the TFC selection unit 25 decreases the UE pointer by one to decrease the maximum TFC. The TFC state monitor unit 27 calculates the transmission power required to perform transmission at a predetermined communication quality with respective to each TFC within the TFCS, from the currently used transmission power and TFC, and prohibit the use of a TFC(s) which requires transmission power exceeding the maximum power.

The mobile station 2 additionally includes a requested TFC update unit 28 and an RR message generation unit 29, in order to appropriately generate RR messages in response to transmission state of the data blocks. The requested TFC update unit 28 calculates a requested TFC necessary for satisfying the desired transmission rate of the data blocks from the data amount of the data blocks accumulated in the transmission buffer 21. Additionally, the requested TFC update unit 28 generates an update request requesting the increase of the maximum TFC, and provides the update request for the RR message generation unit 29, when the requested TFC is larger than the maximum TFC, and the use of the TFC larger than the maximum TFC by one is not prohibited. Otherwise, the requested TFC update unit 28 generates an update request requesting the decrease of the maximum TFC, and provides the update request for the RR message generation unit 29. The RR message generation unit 29 generates the RR messages from the update requests received from the requested TFC update unit 28, through the same operation as to the operation in which the RG message generation unit 19 within the base station 1 generates the RG messages from the update instructions. Specifically, the RR message generation unit 29 is provided with a memory 29a, and a message generating unit 29b. The memory 29a stores the update requests received from the requested TFC update unit 28. The message generating unit 29b generates the RR messages from the update requests stored in the memory 29a. As described above, the N-th RR message is generated from the (N−1)-th and N-th update requests, and the (N+1)-th RR message is generated from the N-th and (N+1)-th update requests. The association of the N-th RR message with the (N−1)-th and N-th update requests is as shown in FIG. 8. The generated RR messages are transmitted to the base station 1 by the transmission unit 22 through the uplink E-DPCCH 5.

Figure 11:
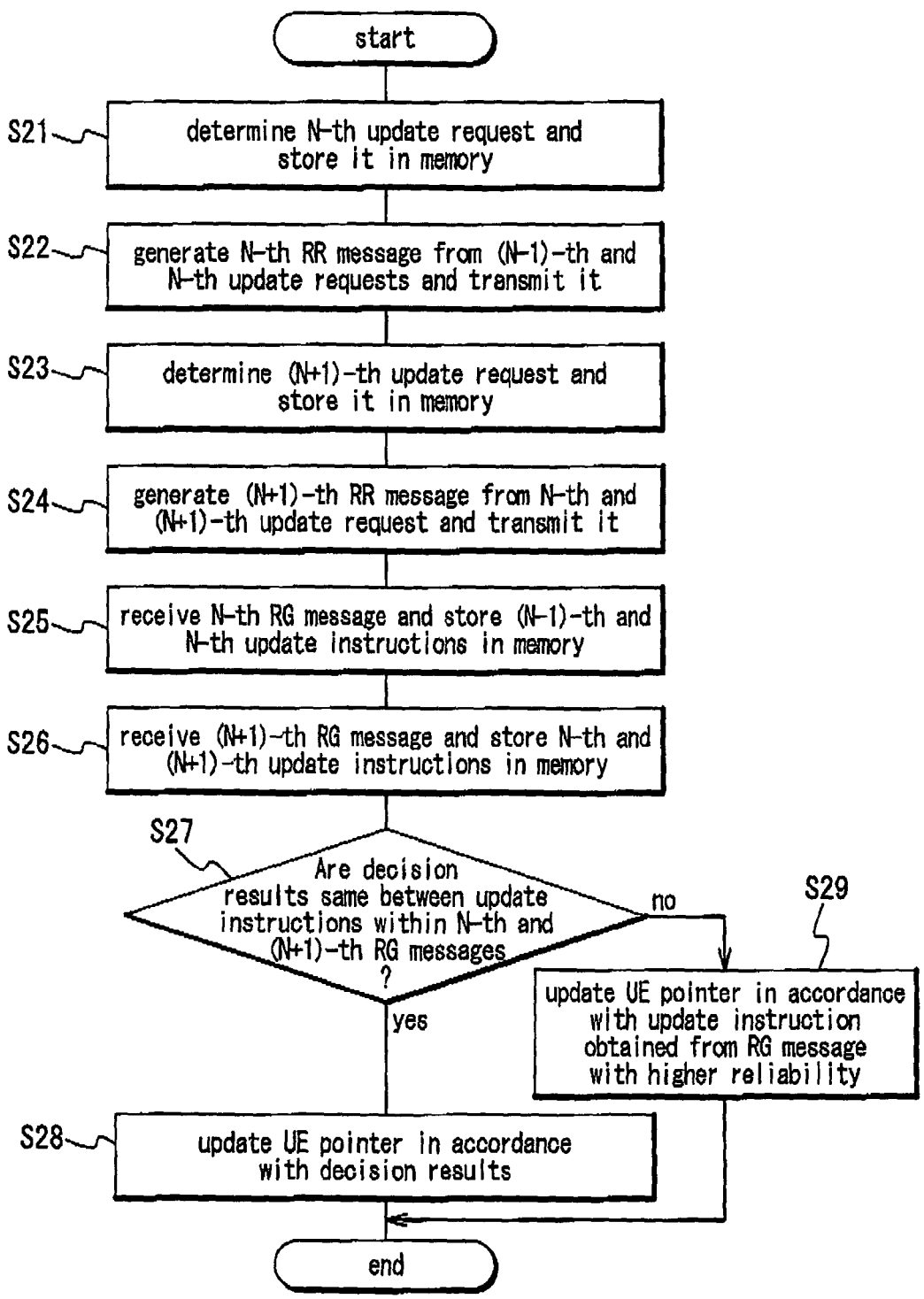
FIG. 11 is a flowchart illustrating the procedure of controlling allowed TFCs within the mobile station in this embodiment.

FIG. 11 is a flowchart illustrating the procedure of the control of the maximum TFC of the mobile station 2 by the RR messages and the RG messages. It should be noted that it is presumed that the (N−1)-th update request is stored in the memory 29a within the RR message generation unit 29.

The RR messages are generated as follows: When the N-th update request is generated by the requested TFC update unit 28 within the mobile station 2 in a certain TTI (the N-th TTI), the N-th update request is stored in the memory 29a within the RR message generation unit 29 (Step S21). The N-th RG message is generated from the (N−1)-th and the N-th update requests, and transmitted to the base station 1 through the uplink E-DPCCH 5 (Step S22). The (N+1)-th update request is then generated by the requested TFC update unit 28 in the next TTI (the (N+1)-th TTI), and stored in the memory 29a (Step S23). The (N+1)-th RG message is generated from the N-th and (N+1)-th update requests, and transmitted to the base station 1 through the uplink E-DPCCH 5 (Step S24).

The base station 1 generates the N-th and (N+1)-th RG messages in response to the N-th and (N+1)-th RR messages, and transmits these RG messages to the mobile station 2 through the downlink E-DPCCH 6. In the mobile station 2, the maximum TFC is adjusted in response to the RG messages through the operation described in the following. When the N-th RG message is received by the mobile station 2, the (N−1)-th and N-th update instructions described in the N-th RG message are recognized by the soft decision unit 25a, and stored in the memory 25b (Step S25). Correspondingly, the N-th update instruction described in the (N+1)-th RG message is recognized, and stored in the memory 25b (Step S26). Next, the N-th update instruction obtained from the N-th RG message and the N-th update instruction obtained from the (N+1)-th RG message are compared by the update instruction decision unit 25. When these are identical, the UE pointer is updated in response to the N-th update instruction (Step S28). When these are different, on the other hand, the N-th update instruction obtained from the RG message with higher soft decision reliability is finally determined as the N-th update instruction, and the UE pointer is updated in response to the N-th update instruction determined (Step S29).

It would be easily understood that such operation of the mobile station 2 specifically implements the above-described communication method of the RR messages and the RG messages.

(Control of Transmission Buffer)

In a preferred embodiment, the mobile communication system 10 is configured to determine the allowed TFCs of each mobile station 2 in response to the data amount of the data blocks stored in the transmission buffer 21 of the mobile station 2. In this case, each motile station 2 is preferably configured to transmit the data amount of the transmission buffer 21 in the same procedure as that of the RR messages described above.

Specifically, it is preferable that each mobile station 2 transmits the data amount of the transmission buffer 21 in the procedure described below. Each mobile station 2 periodically measures the data amount of the data blocks stored in the transmission buffer 21. Additionally, each mobile station 2 generates the N-th data amount message through coding the data amount (N−1)-th measured, and the data amount N-th measured. In the following, the data amount k-th measured is simply referred to as the k-th data amount. The allowed-bit sequences of the generated data amount messages are determined in advance, and the bit sequence of the N-th data amount message is selected from predetermined bit sequences on the basis of the (N−1)-th and N-th data amounts. Correspondingly, the bit sequence of the (N+1)-th data amount message is determined from the data amounts N-th and (N+1)-th measured. The data amount messages are transmitted at intervals of one TTI at the minimum limit.

When the N-th and (N+1)-th data amount messages are transmitted to the base station 1, the base station 1 reproduces the N-th measured data amount from the N-th and (N+1)-th data amount messages. The procedure of reproducing the N-th measured data amount is same as the procedure of reproducing the N-th update request from the N-th and (N+1)-th RR messages.

When the data amount of the transmission buffer 21 within each mobile station 2 is reproduced, the base station 1 preferentially increases the maximum TFC of a mobile station(s) 2 in which the data amount of the transmission buffer 21 is large. This allows appropriate control of the noise rise.

The transmission of the data amounts of the transmission buffers 21 through the above-described communication method improves the transmission reliability of the data amounts, while avoiding the decrease in the transmission throughput of the data amounts.

The data amounts of the transmission buffers 21 may be informed to the base station 1 through the same communication method as the ACK/NACK messages. In this case, each data amount message is composed of first and second fields, and the first field contains the N-th measured data amount, while the second field contains the (N−1)-th measured data amount. Correspondingly, the first field of the (N+1)-th data amount message contains the (N+1)-th measured data amount, and the second field contains the N-th measured data amount. The N-th data amount is reproduced from the N-th and (N+1)-th data amount messages. The procedure of reproducing the N-th data amount from the N-th and (N+1)-th data amount messages is same as the procedure of reproducing the N-th error detection data from the N-th and (N+1)-th ACK/NACK messages.

As described above, in the mobile communication system 10, one control data (that is, an error detection data, an update request, an update instruction, and a data amount of the transmission buffer 21) is used for the generation of two control messages (that is, ACK/NACK messages, RR messages, RG messages, and data amount messages), and the two control messages are transmitted over two TTIs. Additionally, each control message is generated from two control data, and transmitted in each TTI. This improves the communication reliability of the control data, while suppressing the decrease in the communication throughput of the data blocks and the communication data.

It should be noted that the number of control messages generated from one control data, and the number of the control data used for each control message may be a number other than two. In general, control messages may be generated as described in the following, when the number of control messages generated from one control data, and the number of the control data used for generating each control message are M. The k-th control data is used for the generation of the k-th to (k+M−1)-th control messages, and the j-th control message is generated from the (j−M+1)-th to j-th control data. The generated control messages are transmitted at the same TTIs as the data blocks. On the other hand, the k-th control data is reproduced from the k-th to (k+M−1)-th control messages. It would be easily understood that the embodiment described above corresponds to the case when M is two. The increase in M is preferable for the improvement of the communication reliability of the control data.

It should be additionally noted that the present invention is applicable to communication of control data other than control date described in this embodiment.

The invention claimed is:

1. A wireless communication system comprising:
a first communication apparatus; and
a second communication apparatus,
wherein said first communication apparatus is configured to transmit a plurality of data blocks to the second communication apparatus at predetermined transmission time intervals,
wherein one of said first and second communication apparatuses is configured to generate a plurality of control data used for control of transmission of said plurality of data blocks, to generate a plurality of control messages from said plurality of control data, and to transmit said plurality of control messages to the other of said first and second communication apparatuses at the same time intervals as said transmission time intervals,
wherein each of said control data is used for generation of M control messages out of said plurality of control messages, M being an integer greater than 2, and
wherein each of said control messages is generated from M control data out of said plurality of control data,
wherein each of said plurality of control messages includes M fields,
wherein a first control data from among the plurality of control data is contained in a first field of a first control message out of said M control messages associated with said one control data, a second field of a second control message out of said M control messages, and an M-th field of an M-th control message out of said M control messages, and
wherein said other communication apparatus reproduces said first control data through soft decision on said first field of said first control message, said second field of said second control message, and said M-th field of said M-th control message.

2. The wireless communication system according to claim 1, wherein said plurality of control messages generated from said plurality of control data are transmitted from said second communication apparatus to said first communication apparatus, and
wherein said plurality of said control data respectively include error detection data indicative of whether said respective plurality of data blocks are successfully received by said second communication apparatus.

3. The wireless communication system according to claim 2, wherein said first communication apparatus reproduces said error detection data from said plurality of control messages, and retransmits to said second communication apparatus data blocks which are not successfully received by said second communication apparatus, in response to said reproduced error detection data.

4. The wireless communication system according to claim 1, wherein said plurality of control messages generated from said plurality of control data are transmitted from said second communication apparatus to said first communication apparatus,
wherein said plurality of said control data respectively include transmission rate instruction data by which said second communication apparatus instructs to said first communication apparatus a maximum transmission rate allowed for transmission of said data blocks.

5. The wireless communication system according to claim 4, wherein said first communication apparatus reproduces said transmission rate instruction data from said plurality of control messages, and controls transmission rate of said plurality of data blocks in response to said reproduced transmission rate instruction data.

6. The wireless communication system according to claim 1, wherein said control messages generated from said plurality of control data are transmitted from said first communication apparatus to said second communication apparatus,
wherein said control data respectively includes transmission rate request data by which said first communication apparatus requests said second communication apparatus to update a maximum transmission rate allowed for transmission of said data blocks.

7. The wireless communication system according to claim 6, wherein said second communication apparatus reproduces said transmission rate request data from said plurality of control messages, and controls a maximum transmission rate allowed for transmission of said data blocks in response to said reproduced transmission rate request data.

8. The wireless communication system according to claim 1, wherein said plurality of control messages generated from said plurality of control data are transmitted from said first communication apparatus to said second communication apparatus, and
wherein said plurality of control data respectively includes data amount data indicative of data amount of a transmission buffer in which said first communication apparatus stores said data blocks before transmission of said data blocks.

9. The wireless communication system according to claim 8, wherein said second communication apparatus reproduces said data amount data from said plurality of control messages, and controls a maximum transmission rate allowed for transmission of said data blocks in response to said reproduced data amount data.

10. The wireless communication system according to claim 1, wherein each of said M control messages associated with said one control data includes one selected bit sequence which is selected from a plurality of predetermined bit sequences in response to said M control data used for generation of said M respective control messages, and
wherein said other communication apparatus is configured to determine the most likely bit sequences of said respective plurality of control messages through performing soft decision on said respective plurality of control messages, to determine M candidates of said one control data from said respective most likely bit sequences of said plurality of control messages, and to finally determine said one of control data from said M candidates based on reliabilities of said M control messages associated with said one control data, said reliabilities being calculated in said soft decision.

11. A method of wireless communication between a first communication apparatus and a second communication apparatus, the method comprising:
(a) transmitting a plurality of data blocks from a first communication apparatus to a second communication apparatus at predetermined transmission time intervals;
(b) generating a plurality of control data used for control of communication of said plurality of data blocks;
(c) generating a plurality of control messages from said plurality of control data; and
(d) transmitting said plurality of control messages at same time intervals as said transmission time intervals,
wherein each of said plurality of control data is used for generation of M control messages out of said plurality of control messages, M being an integer greater than 2, and
wherein each of said plurality of control messages is generated from M control data out of said plurality of control data,
wherein each of said plurality of control messages includes M fields,
wherein a first control data from among the plurality of control data is contained in a first field of a first control message out of said M control messages associated with said one control data, a second field of a second control message out of said M control messages, and an M-th field of an M-th control message out of said M control messages, and
wherein said first control data is reproduced through soft decision on said first field of said first control message, said second field of said second control message, and said M-th field of said M-th control message.

12. A wireless communication system comprising:
a first communication apparatus; and
a second communication apparatus wirelessly communicating said first communication apparatus,
wherein said first communication apparatus is configured to transmit a plurality of data blocks to the second communication apparatus at predetermined transmission time intervals,
wherein one of said first and second communication apparatuses is configured to generate a plurality of control data used for control of transmission of said plurality of data blocks, to generate a plurality of control messages from said plurality of control data, and to transmit said plurality of control messages to the other of said first and second communication apparatuses at the same time intervals as said transmission time intervals,
wherein each of said control data is used for generation of M control messages out of said plurality of control messages, M being an integer greater than 2, and
wherein each of said control messages is generated from M control data out of said plurality of control data,
wherein a first control data from among the plurality of control data is contained in a first field of a first control message out of said M control messages associated with said one control data, a second field of a second control message out of said M control messages, and an M-th field of an M-th control message out of said M control messages, and
wherein said other communication apparatus reproduces said first control data through soft decision on said first field of said first control message, said second field of said second control message, and said M-th field of said M-th control message.

13. A communication apparatus comprising:
a transmission unit transmitting a plurality of data blocks at predetermined transmission time intervals;

a reception unit receiving a plurality of control messages transmitted at said predetermined transmission time intervals; and a control data decision unit reproducing a plurality of control data used for control of communication of said data blocks from said plurality of control messages, wherein each of said control messages is generated from M control data out of said plurality of control data so that each of said control data is used for generation of M control messages out of said plurality of control data, M being an integer greater than 2, wherein said control data decision unit reproduces each of said plurality of control data from M associated control messages out of said plurality of control messages, wherein a first control data from among the plurality of control data is included in a first field of a first control message out of said M control messages associated with said one control data, a second field of a second control message out of said M control messages, and an M-th field of an M-th control message out of said M control messages, and wherein said control data decision unit reproduces said first control data through soft decision on said first field of said first control message, said second field of said second control message, and said M-th field of said M-th control message.

14. A wireless communication apparatus comprising:

a reception unit receiving a plurality of data blocks transmitted at predetermined transmission time intervals, and a plurality of control messages transmitted at said predetermined transmission time intervals; and a control data decision unit reproducing a plurality of control data used for control of communication of said plurality of data blocks, from said plurality of control messages, wherein each of said control messages is generated from M control data out of said plurality of control data so that each of said control data is used for generation of M control messages out of said plurality of control data, M being an integer greater than 2, wherein said control data decision unit reproduces each of said plurality of control data from M associated control messages out of said plurality of control messages, wherein a first control data from among the plurality of control data is included in a first field of a first control message out of said M control messages associated with said one control data, a second field of a second control message out of said M control messages, and an M-th field of an M-th control message out of said M control messages, and wherein said control data decision unit reproduces said first control data through soft decision on said first field of said first control message, said second field of said second control message, and said M-th field of said M-th control message.

15. A WCDMA system comprising:

a base station; and a mobile station configured to transmit a plurality of data blocks to the base station at predetermined transmission time intervals, wherein one of said mobile and base stations is configured to generate a plurality of control data used for control of transmission of said data blocks to said base station, to generate a plurality of control messages from said plurality of control data, and to transmit said plurality of control messages to the other of said mobile and base stations at the same time intervals as said transmission time intervals, wherein each of said control data is used for generation of M control messages out of said plurality of control messages, M being an integer greater than 2, and wherein each of said control messages is generated from M control data out of said plurality of control data, wherein a first control data from among the plurality of control data is contained in a first field of a first control message out of said M control messages associated with said one control data, a second field of a second control message out of said M control messages, and an M-th field of an M-th control message out of said M control messages, and wherein the other one of said mobile and base stations reproduces said first control data through soft decision on said first field of said first control message, said second field of said second control message, and said M-th field of said M-th control message.

16. The WCDMA system according to claim 15, wherein said plurality of control messages generated from said plurality of control data are transmitted from said base station to said mobile station, and wherein said plurality of control data respectively includes error detection data indicative of whether or not said respective plurality of data blocks are successfully received by said base station.

17. The WCDMA system according to claim 16, wherein said mobile station reproduces said error detection data from said plurality of control messages, and retransmits data blocks out of said plurality data blocks, which are not successfully received by said base station, in response to said reproduced error detection data.

18. The WCDMA system according to claim 15, wherein said plurality of control messages generated from said plurality of control data are transmitted from said base station to said mobile station, and wherein said plurality of control data respectively includes TFC update instructions instructing update of allowed TFCs "allowed transport format combinations" of said mobile station.

19. The WCDMA system according to claim 18, wherein said mobile station reproduces said allowed TFC instructions from said plurality of control messages, and controls said allowed TFCs in response to said reproduced TFC update instructions.

20. The WCDMA system according to claim 15, wherein said plurality of control messages generated from said plurality of control data are transmitted from said mobile station to said base station, and wherein said plurality of control data respectively includes TFC update requests by which said mobile station requests said base station to update allowed TFCs of said mobile station.

21. The WCDMA system according to claim 20, wherein said base station reproduces said TFC update requests from said plurality of control messages, and controls said allowed TFCs of said mobile station in response to said reproduced TFC update requests.

22. The WCDMA system according to claim 15, wherein said plurality of control messages generated from said plurality of control data are transmitted from said mobile station to said base station, and wherein said plurality of control data respectively includes data amount data indicative of data amount of a transmission buffer in which said mobile station stores said data blocks before transmission of said data blocks.

23. The WCDMA system according to claim 22, wherein said base station reproduces said data amount data from said plurality of control messages, and controls said allowed TFCs of said mobile station in response to said reproduced data amount data.

24. A wireless communication system comprising:
a first communication apparatus; and
a second communication apparatus,
wherein said first communication apparatus is configured to transmit a plurality of data blocks to the second communication apparatus at predetermined transmission time intervals,
wherein said second communication apparatus is configured to:
generate a plurality of control messages in response to receiving the plurality of data blocks, and
transmit said plurality of control messages to the first communication apparatus,
wherein a first control message and a second control message from among the plurality of control messages are generated in response to receiving a first and second data block from among the plurality of data blocks, respectively,
wherein the second control message includes a first field and a second field, the first field including control data corresponding to reception information of the second data block and the second field including control data corresponding to reception information of the first data block, and
wherein said first communication apparatus reproduces said control data corresponding to reception information of the first data block through soft decision on said second field of said second control message and a first field of the first control message.

25. The wireless communication system of claim 24, wherein the control data included in the first field of the second control message indicates whether the second data block was successfully received by the second communication apparatus and the control data included in the second field of the second control message indicates whether the first data block was successfully received by the second communication apparatus.

26. The wireless communication system of claim 24, wherein the first communication apparatus determines whether to retransmit the first data block based on the control data of the first and second control messages.

* * * * *